Sept. 28, 1965 W. W. WISDOM 3,208,162

SQUARE AND CUBE ROOT DEMONSTRATOR

Filed Dec. 26, 1963

INVENTOR.
WILMONT W. WISDOM
BY
*Eckhoff and Slick*
ATTORNEYS

United States Patent Office 3,208,162
Patented Sept. 28, 1965

3,208,162
SQUARE AND CUBE ROOT DEMONSTRATOR
Wilmont W. Wisdom, 4327 Malcolm Ave., Oakland, Calif.
Filed Dec. 26, 1963, Ser. No. 333,562
2 Claims. (Cl. 35—30)

This invention relates to a method and educational aids for enabling a student to visualize what is occurring during the various steps of finding the square root or cube root of a number.

In the normal method of teaching the extraction of square and cube roots of numbers, a student is taught a set procedure which he learns by rote, but few students visualize the significance of the actual steps as they are carried out. In accordance with the present invention, a set of blocks or similar physical structures are used which have dimensions equivalent to the numbers which are being extracted so that the student can follow through an example with reference to the actual physical structure and gain an insight as to the reason for the manipulative steps involved. In this manner, the student gains a lasting impression and retains the information for a much longer period of time.

In the drawings forming a part of this application:

Figures 1, 2:
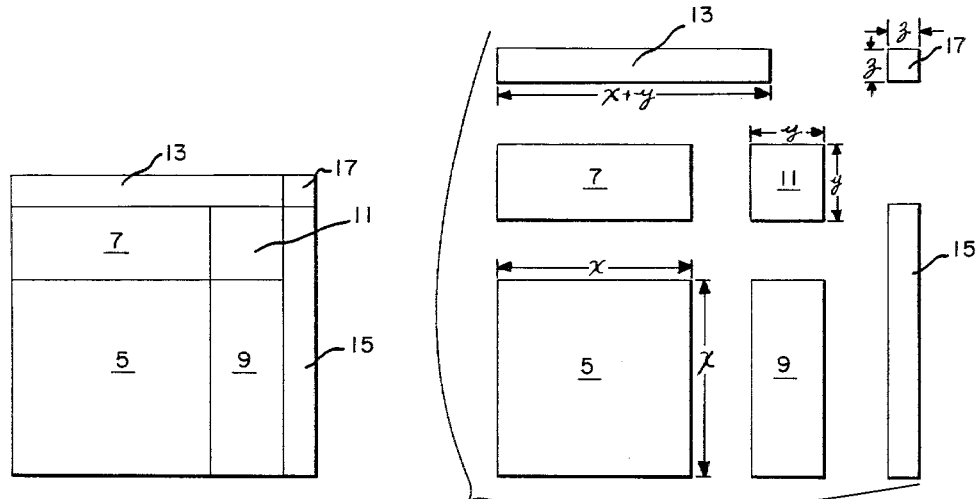
FIGURE 1 is an exploded view of a series of blocks used for illustrating a square root problem.
FIGURE 2 shows the blocks of FIGURE 1 in assembled relationship.

Referring now to FIGURES 1 and 2, the use of the blocks in conjunction with a square root problem will be illustrated. As is well known, in finding the square root, one first separates the given number into periods of two figures each beginning at the units place and then proceeds to find the greatest number whose square is contained in the period on the left. After finding this first large square one finds the next square and so on. For instance, if the problem is to find the square root of 16,641 one would proceed as follows:

1) 1'66'41. (129 = Answer.

$$\begin{array}{r} 1 \\ 2\times 1 = 2 \ \ 2\overline{)\ 66} \\ 44 \\ 2\times 12 = 24 \ \ 9\overline{)\ 22\ 41} \\ 22\ 41 \end{array}$$

Thus, the answer might be visualized as the sum of 100, 20 and 9, representing the digits in each of the three columns. This is shown in physical form in the block set of FIGURES 1 and 2. Thus, a first square 5 is provided, each side of which has a length representing the first digit in the answer of the square root problem. For instance, since in our example the answer is 129, the completed square of FIGURE 2 might be 12.9 inches square which could be visualized as being divided into small squares, each one-tenth of a square inch, so that there will be 16,641 of the small squares. Thus, the largest single square 5 would have dimensions (in terms of one-tenth of an inch squares) of 100 x 100 so that each edge, being 100 units in length, represents the first digit of the answer. The second digit of the answer is represented by the rectangles 7 and 9 and the small square 11. The rectangles 7 and 9 have dimensions of 100 x 20 units while the small square 11 is 20 units on each side. Thus, it can be seen that the rectangles 7 and 9 and the square 11 can be combined with the square 5 to make a still larger square and that the increase in the edge dimensions, i.e., the smaller dimensions of the rectangles, of 20 units represents the second digit of the answer. There is then provided the additional rectangles 13 and 15 and the additional square 17 which are employed to form a still larger square as is shown in FIGURE 2. In this example, the rectangles are 9 units wide and 120 units long while the square is 9 units on each side so that here again the width of the rectangle represents another digit in the answer. Thus, it has been explained how there is built up a series of squares and rectangles representing the square of a number. When the rectangles and the squares are assembled as is shown in FIGURE 2, the ultimate large square has 129 units on each edge and has an area of 16,641 square units. The blocks used in illustrating the square problem need have no substantial thickness and it can be cut out of cardboard, wood or plastic or any other material which will hold its shape.

While the square root of 16,641 has been taken in the above example and has a value of 129, it will be appreciated that the various lengths and widths of the squares and rectangles which are employed in this model need not be in the relationship of 1 to 2 to 9, on the contrary these squares and rectangles may have any of a number of values. Therefore, rather than the one side of the square 5 having the value of 100 units, it could have a value of 100, 200, 300, 400, 500, 600, 700, 800 or 900, that is to say, the digital value of the length of the sides of square 5 can be any number from 1 to 9, both inclusive, the length of the sides is, of course, in the hundredths magnitude. In the drawing and hereafter in the specification and claims, this value is referred to as "$x$." Similarly, the square 11 need not be limited to the length of 20 units but is rather depicted by the letter "$y$" and can have a digital value of from 1 to 9 inclusive. The value of this letter is, of course, of the tens order. Similarly, the length of the square 17 is not to be limited to 9 units but can have any integer value from 1 to 9 inclusive and the order of magnitude of the value of this square is of the units orders. The length of the square 17 is depicted by the letter "$z$." As can be seen from the investigation of FIG. 1, the length of rectangle 13 is the sum of the values $x+y$. Of course, the unit length employed in the above example and in the models illustrated need not be an inch or centimeter but rather can be any fraction or decimal part of any unit of length whatsoever.

Hereinafter in describing the model employed in demonstrating the taking of cube roots, it should be borne in mind that the edge of the largest cube 21 need not be a 100 units of length but rather can have a length wherein the digital value is any number from 1 to 9 and the value of the length is of the hundredths order. In a matter fully analogous to the explanation developed above with regard to the taking of square roots, the dimensions of the cubes 29 and 39 as illustrated in the drawing, have the value of "$y$" and "$z$" respectively.

Figures 3, 4:
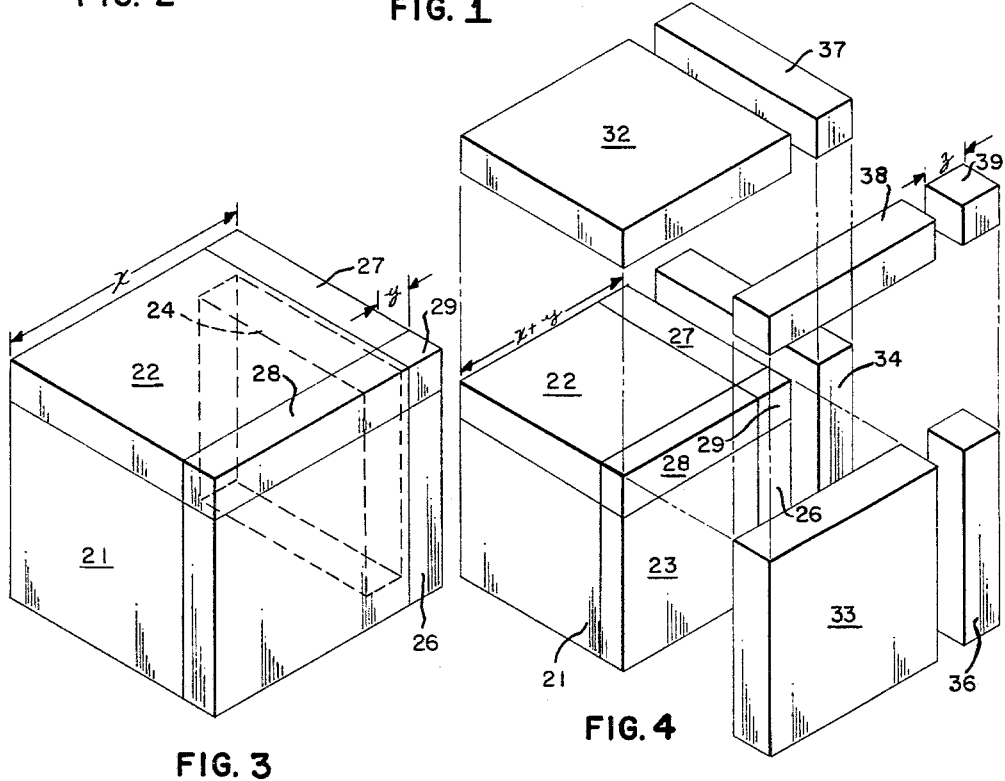
FIGURE 3 shows a plurality of blocks in an assembled relationship.
FIGURE 4 shows a view of the set of blocks of FIG. 3 assembled as before and with additional blocks positioned thereabout illustrating a cube root problem.

FIGURES 3 and 4 show sets of blocks used in a similar manner for illustrating the solution to a cube root problem. In FIGURE 3 only the blocks used for the first two digits are shown. FIGURE 4 shows the blocks which are used for the first two digits consolidated as shown in FIGURE 3, but with the blocks representing the third digit or unit digit positioned thereabout. In contrast with the blocks used in the square root problem, it is important that the blocks used for the cube root problem have considerable thickness as well as width and length so that three-dimensional figures must be used. The blocks used in conjunction with the square root problem may have a thickness as thin as a sheet of paper or any other object one might choose to use. Suitably, the blocks can be made of plastic such as foam plastic, wood, or hollow cardboard figures or the like can be used.

In order to illustrate the finding of a cube root, it is assumed that a solid figure has 129 units on each edge so that the entire solid figure contains 2,146,689 small, imaginary cubes. Thus, the cube root is 129 and in FIGURES 3 and 4 are shown the blocks necessary for visualizing the first, second and third digits. There is shown in FIGURE 3 a plurality of blocks, namely, a first cube 21 having 100 units on each edge or a volume of one million units. We next have three blocks which have one square face which is 100 x 100 and which are 20 units in thickness. Two of these have been designated 22, and 23. The third of these blocks is located behind the blocks shown in FIGURE 3 and is limited on three of its sides by blocks 27, 26 and 21. This block has been outlined in dots and is numbered 24. We next have three rectangular blocks which are 100 x 20 x 20 designated 26, 27 and 28. Lastly, we have one small cube 29 which is 20 x 20 x 20. Thus, it will be seen that the edge dimension of the large cube is 100 units representing the first digit of the answer. When the next larger size cube is formed by the use of the additional blocks illustrated, it will be seen that the small dimension of each of these blocks is 20 units representing the second digit in the answer. The third digit is illustrated in FIGURE 4 and it is obvious from what has gone before, that there will be three blocks 120 x 120 x 9, bearing reference numerals 32, 33 and 34, three 120 x 9 x 9 bearing reference numerals 36, 37 and 38, and one small cube 9 x 9 x 9 bearing reference numeral 39 representing the third digit in the answer. Thus, the cube root problem is visualized.

It will be understood, of course, that the specific examples given are only for purposes of illustration and that any other numbers might have been employed. Further, use can be made of the squares, rectangles, square blocks and rectangular blocks in the object examples for both square root and cube root of other than the given number 129 used in the example by the substitution of numbers from 1 up to and including the number 999. Numbers over 999 would necessitate additional object examples which would follow the principles described. However, for the purpose of ease in a demonstration it is suggested that any number chosen be first raised to the second or third power before attempting to extract the respective square root or cube root of the number thus obtained. Also when using a number for demonstration other than the number 129, the student will have to be informed that the various squares, rectangles, square blocks and rectangular blocks will necessarily have to increase or decrease in size by the use of his imagination.

I claim:
1. An educational aid comprising a composite parallelpiped, the length and width of the sides each having a value of $x+y+z$ and wherein $z$ is the unit value of the length side, $y$ is the tens value of the length side and $x$ is the hundredths value of the length side and wherein the digital value of $x$, $y$ and $z$ are integers having a value of from 1 to 9 inclusive, said parallelpiped comprising seven three dimensional units, one unit having a length equal to $x$ and width equal to $x$, two others having a length equal to $x$ and width equal to $x$, two others having a length equal to $x$ and width equal to $y$, one other having a length and width each equal to $y$, two other having a length equal to $(x+y)$ and width equal to $z$ and one other having a length and width each equal to $z$.

2. An educational aid comprising a composite cube, each side of which has a length of $x+y+z$, wherein $z$ is the unit value of the length of each side, $y$ is the tens value of the length of each side and $x$ is the hundredths value of the length of each side and wherein the digital value of $x$, $y$ and $z$ are integers having a value of from 1 to 9 inclusive, said composite cube comprising fifteen three dimensional units, one unit having definitive sides $x$, $x$, $x$, three other units having definitive sides $x$, $x$, $y$, three other units having definitive sides $x$, $y$, $y$, one other unit having definitive sides $y$, $y$, $y$, three other units having the definitive sides $(x+y)$, $(x+y)$, $z$, three other units having the definitive sides $(x+y)$, $z$, $z$, and one other unit having the definitive sides $z$, $z$, $z$.

References Cited by the Examiner

UNITED STATES PATENTS

| | | | |
|---|---|---|---|
| 205,960 | 7/78 | Hill | 35—72 |
| 508,298 | 11/93 | Fulton | 35—72 |

FOREIGN PATENTS 493,701  2/50  Belgium.

EUGENE R. CAPOZIO, *Primary Examiner.*

LAWRENCE CHARLES, *Examiner.*

UNITED STATES PATENT OFFICE
CERTIFICATE OF CORRECTION

Patent No. 3,208,162 September 28, 1965

Wilmont W. Wisdom

It is hereby certified that error appears in the above numbered patent requiring correction and that the said Letters Patent should read as corrected below.

Column 4, lines 13 and 14, strike out "two others having a length equal to x and a width equal to x,".

Signed and sealed this 10th day of May 1966.

(SEAL)
Attest:

ERNEST W. SWIDER  
Attesting Officer

EDWARD J. BRENNER  
Commissioner of Patents